Feb. 7, 1956  J. H. KAUFFMAN ET AL  2,733,964
BAFFLE BOX FOR PNEUMATIC MATERIAL HANDLING APPARATUS
Original Filed May 6, 1950  2 Sheets-Sheet 1

INVENTORS.
John H. Kauffman & Raymond H. Moote
BY Brown, Jackson, Boettcher & Dienner
ATTORNEYS.

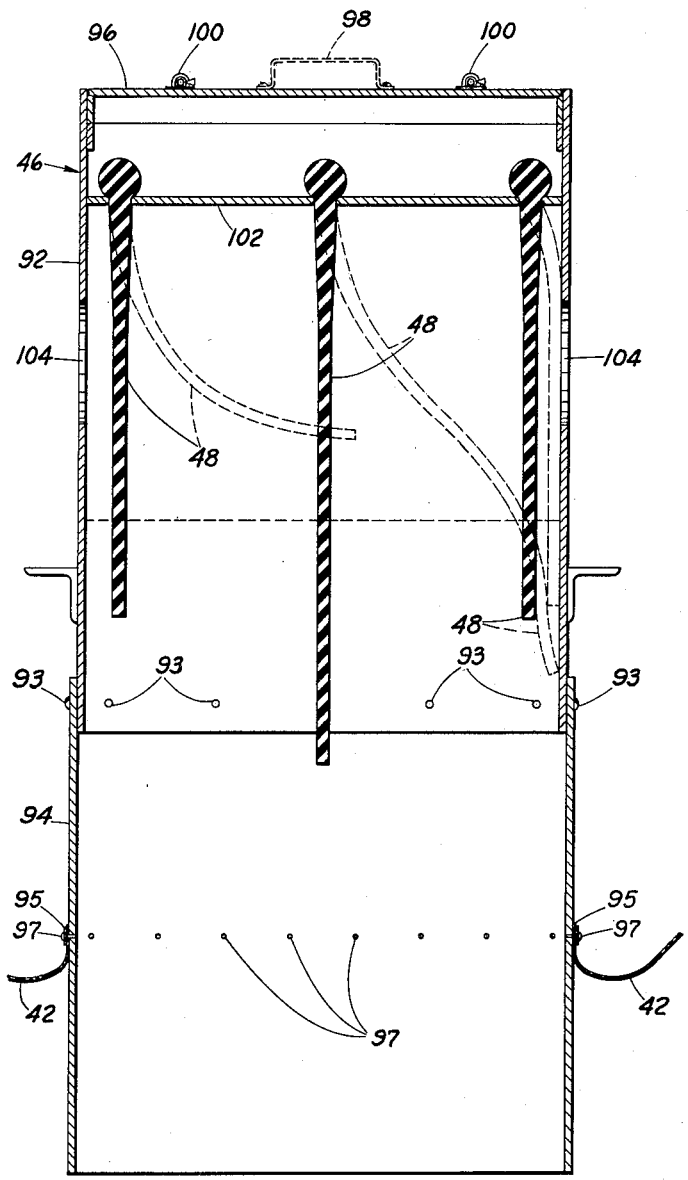
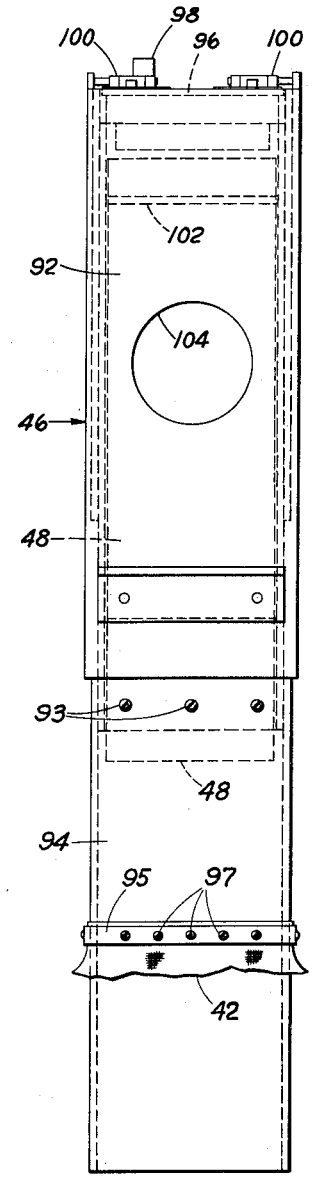
Fig. 2
Fig. 3

United States Patent Office 2,733,964
Patented Feb. 7, 1956

2,733,964

BAFFLE BOX FOR PNEUMATIC MATERIAL HANDLING APPARATUS

John H. Kauffman, Elkhart, Ind., and Raymond H. Moore, Birmingham, Mich., assignors, by mesne assignments, to Studebaker-Packard Corporation, a corporation of Michigan Original application May 6, 1952, Serial No. 286,314. Divided and this application September 23, 1953, Serial No. 381,894

7 Claims. (Cl. 302—59)

The present invention relates to pneumatic material handling apparatus especially adapted for use in the conveyance of granular, powdered, pulverized and like materials, and, particularly, to an improved baffle box for use in controlling the flow of such materials.

The present application is a division of our copending application, Serial No. 286,314, filed May 6, 1952.

Materials of the character referred to above are customarily conveyed automatically by gravity feed. This requires the transportation of the material to elevated positions substantially directly above the stations or the like to which the materials are to be finally delivered. If any substantial lateral movement of the material is required, it is necessary to employ mechanical means, such as belt conveyors, reciprocating conveyors, conveyors or traveling hoppers, to effect the transfer. It will be appreciated, therefore, that a considerable amount of expensive equipment has been required to convey materials of the character described.

Various endeavors have been made to overcome the disadvantages of gravity feed systems. Among these is a pneumatic conveying system wherein the materials may be blown through conduits and the like by means of compressed air. While the pneumatic conveying system has overcome some of the disadvantages of gravity feed, the system has suffered certain disadvantages, the most prominent of which has been the lack of valve means for controlling flow through a main supply conduit and for selectively diverting materials from the supply conduit to any one of a plurality of delivery stations.

In our copending application, above identified, we have disclosed an improved valve means for pneumatic conveying system overcoming the noted disadvantages of conventional systems, the valve means including a baffle box, to which baffle box the present application is particularly directed.

The said valve means, as disclosed in our copending application, includes a removable pipe or conduit section adapted to be disposed in and comprise a portion of the main supply conduit of the conveying system, a movable baffle box adapted to be disposed in the main supply conduit in place of the removable conduit section to divert materials from the main supply conduit, and means for sealing either the conduit section or the baffle box in the supply conduit, the conduit section and baffle box being such that entry thereto may be accomplished at either side thereof whereby bi-directional flow may take place in the supply conduit without changing the operating characteristics of the valve means. By providing for bi-directional flow in the supply conduit, utilization of a plurality of supply hoppers for the system is accommodated, whereby a constant source of supply is insured.

The predominant reason for the failure to device satisfactory valve means for supply system of the character referred to heretofore has been the inability to provide apparatus that would effectively resist the abrasive action of the materials to be conveyed. For the most part, the supply conduit and the conduit section, or corresponding portions of other valve means, are not subject to an extreme degree of abrasive wear, but the sealing means and means for diverting material flow are subject to extreme abrasive action. To overcome the difficulties of the abrasive action, the present invention provides an improved baffle box for conveying systems of the character defined. The baffle box may simply comprise a rectangular box having apertures in opposite walls thereof adapted to be aligned with the ends of the stationary portions of the supply conduit. According to the present invention, a plurality of flexible baffles are loosely or movably mounted in the baffle box and extend across the axis of the apertures in the box. Materials entering at either side of the box under the conveyance of compressed air are deflected or diverted by the baffles. The baffles, being movable and flexible, resiliently absorb the shock of incoming particles of material so that any tendency toward abrasive wear of the baffles is vastly reduced. The baffles are, however, preferably mounted loosely in the baffle box so as to be readily replaceable, since the same eventually will wear out. In addition to the foregoing, the loose mounting and resilient or flexible character of the baffles accommodate movement of the baffles toward one aperture in the box, opposite the aperture through which material is entering, so that the baffle adjacent the former aperture seals the same to prevent flow of material axially through the baffle box.

In addition to the above, it is an object of the present invention to provide improved means for flexibly connecting the baffle box to the delivery station with which the valve means of the system is associated.

Other objects and advantages of the present invention will become apparent in the following detailed description of a preferred embodiment of the invention, wherein reference is made to the accompanying drawings, in which:

Figure 1 is a somewhat schematic representation of a complete pneumatic conveying system, including the system and baffle box valve means referred to hereinbefore, which may suitably comprise a molding and conveying system for foundries or the like;

Figure 2 is a vertical cross sectional view of a preferred embodiment of the baffle box of the present invention; and Figure 3 is a view in end elevation of the baffle box of the invention.

Figure 1:
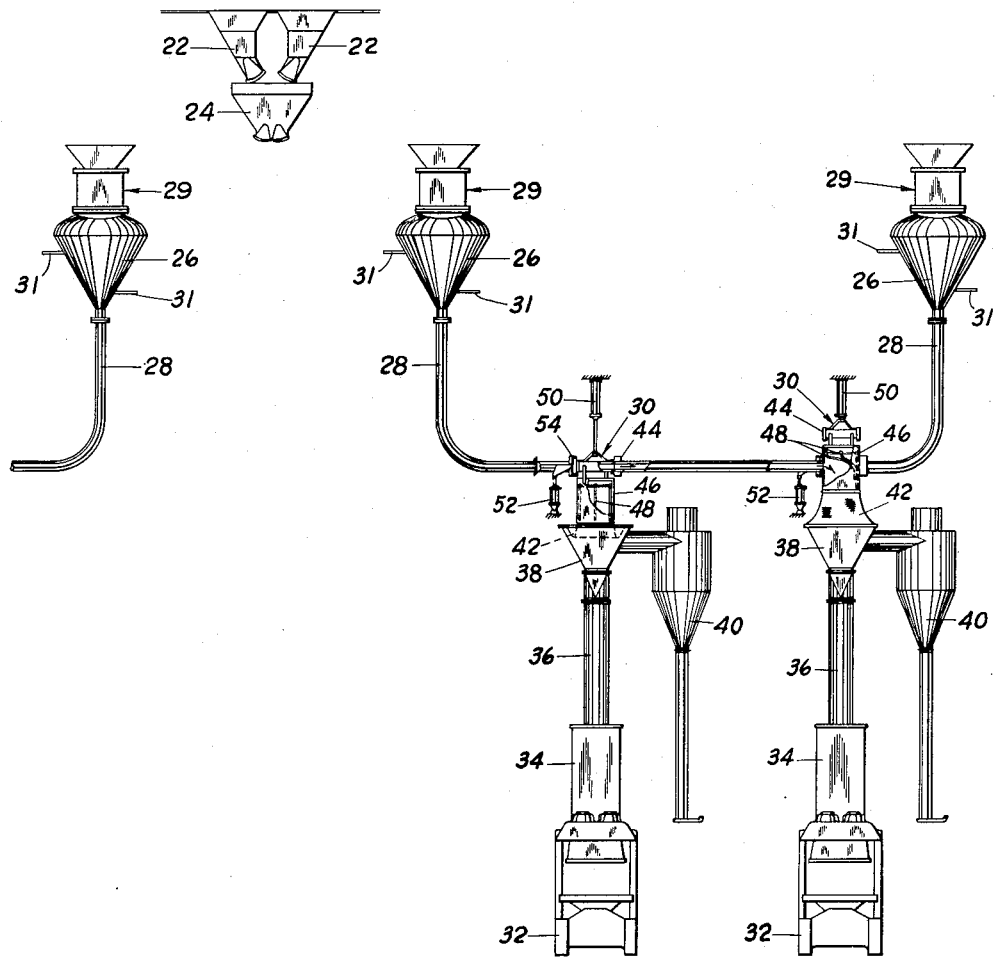

Referring now to Figure 1 of the drawings, an exemplary installation of the conveying system and apparatus is schematically shown, the apparatus and system being suitable for utilization in a foundry for conveying molding sand and the like from central hoppers or storage chambers to any one of a plurality of molding stations. As shown, a plurality of hoppers 20 are adapted for the reception of raw material and constitute the source of supply for the conveying system. The hoppers 20 are each adapted for the reception of materials, such as sand and the like, and are adapted to deliver materials to a plurality of hoppers 22, which are primarily rough measuring hoppers. The hoppers 22 feed the supply materials to a larry car 24 which is adapted to carry the materials to any one of a plurality of supply hoppers or transporters 26. The total capacity of the measuring hoppers 22 should be slightly less than the capacity of the larry car 24 or one of the transporters 26. As will be apparent, the larry car 24 is adapted to comprise a traveling hopper or to be transported by a crane to deliver the supply materials to any one of the plurality of transporters 26.

Each of the transporters 26 is associated with a conveying system which may include a single hopper or transporter 26 for each system, a single hopper or transporter for a plurality of systems, or, a plurality of hoppers for each system, the latter being preferred. A feed conduit 28, in the nature of a rigid pipe or the like, is associated with the outlet of each of the hoppers 26 and is adapted for conveying materials throughout the system. A valve unit, indicated generally at 29, is associated with each of the transporters 26 to control the introduction of material thereto. Air for transporting materials through the conduits 28 may be introduced, as schematically indicated by a pipe 31, at a plurality of jets into the hoppers 26 to force materials from the hoppers into the conduits 28 and to convey the materials through the conduits 28. Preferably, as shown, the feed conduit 28 is associated at each end thereof with a transporter 26 so that materials may be fed through the conduit 28 from either end thereof, whereby a continuous source of supply materials for the conveying system is insured.

Included within each conduit line 28 are a plurality of valve units 30, of the baffle box type, each adapted to govern the feed of material to a station defined by a valve. For example, a plurality of molding stations may be included in each feeding system. As shown, each molding station comprises a mold table or molding machine 32, a hopper 34 for feeding materials to the molding station 32, a conduit 36 leading to the hopper 34 and a hopper 38 leading into the conduit 36, an air separator and dust or dirt collector 40 associated with the hopper 38 and a flexible boot 42 or the like by means of which the valve units 30 are associated with the delivery station.

Each of the valve units 30 generally includes a removable pipe or conduit section 44 adapted to form a part of the conduit line 28 and a baffle box 46 adapted to be substituted in the conduit 28 for the removable conduit section 44 to divert materials from the conduit 28 to the station with which the valve is associated. Each baffle box 46 has mounted therein a plurality of flexible baffles 48, by means of which the material is diverted from the conduit or feed line 28 to the station defined by the valve unit. Each valve unit is provided with a motor unit or air cylinder, or the like, 50 to effect substitution of the baffle box 46 for the removable conduit section 44 and vice versa. Each valve unit preferably includes a second motor unit or air cylinder 52 adapted to effect actuation of a seal 54 selectively to seal the removable conduit section 44 and the baffle box 46 in the feed conduit 28.

In use and operation of the system, supply materials are conducted to the supply hoppers 20 and from there are gravity fed into the measuring hoppers 22 which, by gravity, feed materials into the larry car 24. The car 24 is then moved to any one of the plurality of transporters 26 to fill the transporter, which is then blown to convey material through the system. When it is desired to convey the materials throughout the system, suitable means are actuated to effect air feed to the filled transporter 26 to force the material therein through the conduit 28. Normally, however, air flow through the conduit 28 is not effected until such time as material feed to one delivery station is required. When it is desired to feed material to one of the delivery stations, suitable means are actuated, either manually or automatically, to effect actuation of the air cylinder or motor 52 to unseal the removable pipe section or conduit 44 of the particular valve unit so that the same may readily be removed from the conduit 28. After the seal 54 has been broken, the air cylinder or motor 50 may be suitably actuated, either manually or automatically, to move the valve unit 30 upwardly to remove the pipe section 44 from the conduit 28 and to move the baffle box 46 into the conduit 28. When the baffle box 46 has been moved into the conduit, the motor or air cylinder 52 may be actuated, either manually or automatically, to seal the baffle box in the feed conduit. Thereafter, the air feed means is actuated to blow the transporter to supply and convey material through the conduit 28. For example, as shown in Figure 1, it may be considered that the transporter 26, at the left side of the complete conveying system shown, is filled with material and that air is being supplied thereto to convey materials through the conduit 28, through the removable pipe section 44 of the valve unit disposed to the left in the figure, and into the baffle box 46 of the valve unit 30 shown to the right in the figure, as is indicated by the arrows. As the material, conveyed by compressed air, enters the baffle box 46, the flexible baffles 48 absorb the shock of the entering material and divert the flow of material from the conduit 28 into the hopper 38 connected to the baffle box by the flexible boot 42. As is shown in Figure 1, the baffles 48 in the baffle box 46 preferably depend loosely into the baffle box so that as the material enters the baffle box, the baffles are moved to the opposite side of the baffle box to seal the opposite side thereof, whereby materials are efficiently diverted from the conduit 28 into the hopper 38 and ultimately to the delivery station hopper 34.

Further details of the construction and operation of the pneumatic conveying system are fully disclosed in our copending application, Serial No. 286,314, referred to hereinbefore. As to the sealing means 54 incorporated in the system, reference is also made to our copending application Serial No. 381,944, filed September 23, 1953, which is also a division of our application, Serial No. 286,314.

With regard to the details of construction of a preferred embodiment of the baffle box of the present invention, reference is now made to Figures 2 and 3, wherein the baffle box 46 is shown as comprising an upper rectangular chamber or box portion 92, a lower rectangular chamber or box portion 94 secured to the box portion 92, and a removable cover 96 for the box portion 92. The two box portions and the cover may suitably be made in a conventional manner from sheet metal and the two box portions are preferably secured together by means of screws 93 or the like. The cover 96 is provided with a handle 98 and a plurality of bolt locks 100 adapted detachably to secure the cover to the upper baffle box portion 92. Adjacent the upper end thereof, the baffle box portion 92 is provided with means for supporting the baffles in a loosely hanging manner. Such means may take any desired form, but preferably comprises a transverse plate or partition 102 having a plurality of slots therein adapted for the reception of the flexible baffles 48. The transverse plate or partition 102 may be suitably secured within the box portion 92 by welding or the like. As an alternative, spaced parallel rods may be provided to support the baffles. As pointed out hereinbefore, the baffles 48 are preferably formed of resilient material, such as rubber, and depend in a loose or loosely hanging manner from the hanging means or partition 102 so as to be movable and flexible within the baffle box 46, whereby they are adapted to yield and flex to absorb the force of the incoming particles of material without undue wear. The baffles are preferably three in number, with the central baffle being considerably longer than the two side baffles. Accordingly, as materials enter through one side of the baffle box, through suitable apertures 104 provided in opposite walls of the box portion 92, the three baffles are swung or moved in the direction of material flow so that the baffle opposite the inlet aperture is forced against the side wall of the box in which the other aperture is provided to seal the said other aperture and prevent exit of material from the baffle box, except through the open bottom end of the lower box portion 94 thereof. The baffle adjacent the inlet aperture and the elongate central baffle divert the material entering through the inlet aperture so that the same gravitates downwardly through the open bottom end of the baffle box portion 94. The other side baffle and portions of the central baffle line the wall of the box to prevent abrasive action thereon.

As is clearly shown in Figure 2, the baffles 48 are preferably integral members provided with enlarged head portions adapted to engage the upper surface of the hanging means or horizontal partition 102 in the baffle box 46, so that the baffles depend in a loosely hanging manner from the partition 102. Due to the particular manner of mounting the baffles, and to the provision of a removable cover for the baffle box 46, the baffles may be readily removed and replaced whenever necessary.

The baffle box portion 94 extends downwardly and normally extends into the hopper 38, to which it is flexibly connected by means of the boot 42. The boot 42 preferably comprises a piece of canvas or the like secured to the peripheral wall of the baffle box portion 94, by a suitable strap 95 and screws 97, and to the upper wall or surface of the hopper 38, as is shown in Figure 1. The boot 42 is preferably detachably secured to the baffle box portion 94 and to the hopper 38 so as to be readily replaceable.

In use, as material enters one of the apertures 104 in the baffle box, the baffles 48 will yieldably flex and move so that the inlet aperture 104 is fully opened and the aperture at the opposite side of the baffle box is yieldably shut by means of the baffle adjacent thereto sealingly engaging the wall of the baffle box about the aperture 104. The short baffle 48 adjacent the inlet aperture and the elongate central baffle effectively divert all of the material introduced to the baffle box from the conduit 28 so that the material gravitates through the open lower end of the baffle box portion 94 and into the hopper 38, with which the baffle box is associated. The baffle 48 adjacent the opposite wall of the box protects that wall from the abrasive action of the entering material.

From the foregoing, it will be appreciated that the present invention provides a highly efficient and practical baffle box for pneumatic conveying system. Due to the flexible nature and movable mounting thereof, the baffles 48 in the baffle box are capable of service over extended periods of time. However, particularly with the use of abrasive materials, it will be appreciated that the baffles may eventually wear out, in which case the baffles may be readily replaced, according to the structure of the present invention, by removal of the baffle box cover 96, removal of the worn out baffles 48, and the insertion of new baffles in a ready and convenient manner.

While we have described what we regard to be a preferred embodiment of our invention, it will be apparent that various changes, rearrangements and modifications may be made therein without departing from the spirit and scope of the invention, as defined by the appended claims.

We claim:

1. A baffle box for pneumatic conveying systems comprising a box-like body member, said body member having aligned apertures in opposite walls thereof, supporting means in said body member adjacent the top thereof, and a plurality of baffles disposed in said body member said baffle including portions loosely resting on said supporting means, said baffles depending freely from said supporting means in a loosely hanging manner, whereby said baffles are movably supported within and are readily detachable from said body member, said baffles extending across said aligned apertures and blocking direct communication therebetween.

2. A baffle box as set forth in claim 1, wherein said baffles are flexible.

3. A baffle box for pneumatic conveying systems comprising a box-like body member, said body member having aligned apertures in opposite walls thereof, a plurality of elongate resilient baffles disposed within said body member, each of said baffles having an enlarged head and means in said body member adjacent the top thereof adapted to be engaged by the enlarged heads of said baffles to support said baffles in said body member in a loosely hanging manner, said baffles extending across said aligned apertures and blocking direct communication therebetween.

4. A baffle box for pneumatic conveying systems comprising a box-like body member, said body member having aligned apertures in opposite walls thereof, a plurality of elongate resilient baffles disposed within said body member, each of said baffles having an enlarged head, and means in said body member adjacent the top thereof adapted to be engaged by the enlarged heads of said baffles to support said baffles in said body member in a loosely hanging manner, said baffles extending across said aligned apertures and blocking direct communication therebetween, said baffles being three in number and including two relatively short baffles disposed adjacent each of said apertures and an elongate central baffle.

5. In a baffle box as set forth in claim 4, said body member being open at the bottom, and a detachable cover for said body member.

6. A baffle box comprising a rectangular box open at its top and bottom, a removable cover for the top of said box, a partition in said box disposed in spaced parallel relation to said cover, said partition having a plurality of spaced parallel slots therein disposed in parallel relation to opposite walls of said box, an inlet aperture in each of said opposite walls of said box below said partition, and a flexible baffle extending through each of said slots in said partition and depending therefrom beyond the said inlet apertures to block direct communication between said apertures, each of said baffles extending freely through the respective slot in said partition and having an enlarged head rested upon said partion whereby said baffles depend from said partition in a loosely hanging manner.

7. A baffle box for pneumatic conveying systems comprising a rectangular box open at its top and bottom, a removable cover for the top of said box, lock means detachably securing said cover to said box, a horizontal partition in said box disposed in spaced parallel relation to said cover beneath said cover, said partition having at least three spaced parallel slots therein disposed in parallel relation to opposite walls of said box and of a length substantially equal to said opposite walls, an inlet aperture in each of said opposite walls of said box below said partition, and a generally rectangular flexible baffle of a width substantially equal to the length of said slots extending through each of said slots in said partition and depending therefrom beyond the said inlet apertures to block direct communication between said apertures, each of said baffles extending freely through the respective slot in said partition and having an enlarged head rested upon such partition whereby said baffles depend from said partition in a loosely hanging manner, said partitions being movable and flexible and upon entry of compressed air through either of said inlet apertures being movable to seal the other inlet aperture and to divert the air and any materials carried thereby through the open bottom of said box.

References Cited in the file of this patent
UNITED STATES PATENTS

| | | |
|---|---|---|
| 412,388 | Hungerford | Oct. 8, 1889 |
| 824,585 | Rieth | June 26, 1906 |
| 1,301,427 | Girtanner | Apr. 22, 1919 |
| 1,417,052 | Gasteiger | May 23, 1922 |